(12) United States Patent
Frisch et al.

(10) Patent No.: US 9,568,350 B2
(45) Date of Patent: Feb. 14, 2017

(54) GEAR FLOWMETER

(71) Applicant: KEM Kueppers Elektromechanik GmbH, Karlsfeld (DE)

(72) Inventors: Juergen Frisch, Diedorf (DE); Harald Bieling, Pasenbach (DE); Thomas Steuer, Dachau (DE)

(73) Assignee: KEM Kueppers Elektromechanik GmbH, Karlsfeld (DE)

( * ) Notice: Subject to any disclaimer, the term of this patent is extended or adjusted under 35 U.S.C. 154(b) by 137 days.

(21) Appl. No.: 14/362,889

(22) PCT Filed: Jun. 10, 2013

(86) PCT No.: PCT/EP2013/061883
§ 371 (c)(1),
(2) Date: Jun. 4, 2014

(87) PCT Pub. No.: WO2014/023455
PCT Pub. Date: Feb. 13, 2014

(65) Prior Publication Data
US 2015/0135825 A1  May 21, 2015

(30) Foreign Application Priority Data
Aug. 7, 2012 (EP) .................................... 12179494

(51) Int. Cl.
*G01P 21/00* (2006.01)
*G01F 3/10* (2006.01)
(Continued)

(52) U.S. Cl.
CPC ................. *G01F 3/10* (2013.01); *F16C 19/18* (2013.01); *F16C 33/581* (2013.01)

(58) Field of Classification Search
USPC ................................. 73/1.27, 1.28, 162, 261
See application file for complete search history.

(56) References Cited

U.S. PATENT DOCUMENTS 2,859,699 A * 11/1958 Billeter ..................... G01F 3/10
418/129
3,452,596 A * 7/1969 Griffo ....................... G01F 1/08
73/1.28
(Continued)

FOREIGN PATENT DOCUMENTS

DE         9418104 U1    12/1994
EP         0393294 A1    10/1990
(Continued)

OTHER PUBLICATIONS

International Search Report of the International Searching Authority mailed Feb. 13, 2014; PCT/EP2013/061883 filed Jun. 10, 2013.

*Primary Examiner* — Clayton E LaBalle
*Assistant Examiner* — Warren K Fenwick
(74) *Attorney, Agent, or Firm* — Dinsmore & Shohl, LLP (57) ABSTRACT

A gear flow meter for measuring the flow of fluid has a gear chamber in which at least one measuring gear wheel is arranged, a bottom and a cover. A respective rotation shaft is provided centrally relative to each measuring gear wheel. Each measuring gear wheel is rotatably mounted and has a measuring unit to detect a gear rotation, and an evaluation means to determine a flow of the fluid through the gear chamber. A respective receiving area is provided between each measuring gear wheel and the bottom, and also between each measuring gear wheel and the cover, in which receiving area rolling elements are arranged. The rolling elements directly contact the respective measuring gear wheel, the respective rotation shaft and the bottom or cover. The rolling elements are movable as a whole relative to the rotation shaft, the measuring gear wheel and the bottom or cover which they contact.

14 Claims, 6 Drawing Sheets

(51) Int. Cl.
*F16C 33/58* (2006.01)
*F16C 19/18* (2006.01)

(56) References Cited

U.S. PATENT DOCUMENTS

| | | | | |
|---|---|---|---|---|
| 7,968,062 B1* | 6/2011 | Putnam | ............... | G01N 21/03 |
| | | | | 422/401 |
| 8,069,719 B2* | 12/2011 | Tokhtuev | ............... | G01F 3/10 |
| | | | | 73/261 |
| 2012/0031195 A1* | 2/2012 | Skirda | ............... | G01F 3/10 |
| | | | | 73/861.08 |
| 2014/0260672 A1* | 9/2014 | Tokhtuev | ............... | G01F 1/06 |
| | | | | 73/861.77 |

FOREIGN PATENT DOCUMENTS

| | | |
|---|---|---|
| EP | 2336584 A2 | 6/2011 |
| JP | S6251232 | 3/1987 |
| WO | 2007104517 A1 | 9/2007 |

* cited by examiner

Prior Art

Fig. 5

Prior Art

Fig. 6

GEAR FLOWMETER

The present invention relates to a gear flow meter according to the preamble to claim 1.

Gear flow meters can be used in principle to measure any fluid flows. These fluids can be, for example, paints, adhesives, ethanol, solvents, additives, tiny quantities of chemicals, petrol or diesel. It is thus possible in particular to verify the injection in the case of diesel engines.

A generic gear flow meter for measuring the flow of a fluid has a gear chamber, in which at least one measuring gear wheel is arranged, said gear chamber having a bottom and a cover which delimit the gear chamber at end faces of the at least one measuring gear wheel, wherein a respective rotation shaft is provided centrally with respect to each measuring gear wheel, wherein each measuring gear wheel is mounted so as to be rotatable and a fluid is conveyable through the gear chamber to rotate the at least one measuring gear wheel. In addition, such a gear flow meter has a measuring unit to detect a gear rotation and an evaluation means to determine a flow of the fluid through the gear chamber on the basis of the gear rotation.

In the case of these gear flow meters, the fluid is conveyed through the gear chamber between adjacent teeth of the at least one measuring gear wheel and a wall of the gear chamber. Tolerances in the movement of the at least one measuring gear wheel influence the through-flow quantity of the fluid and thus lead to an impairment in measurement precision.

Figure 5:
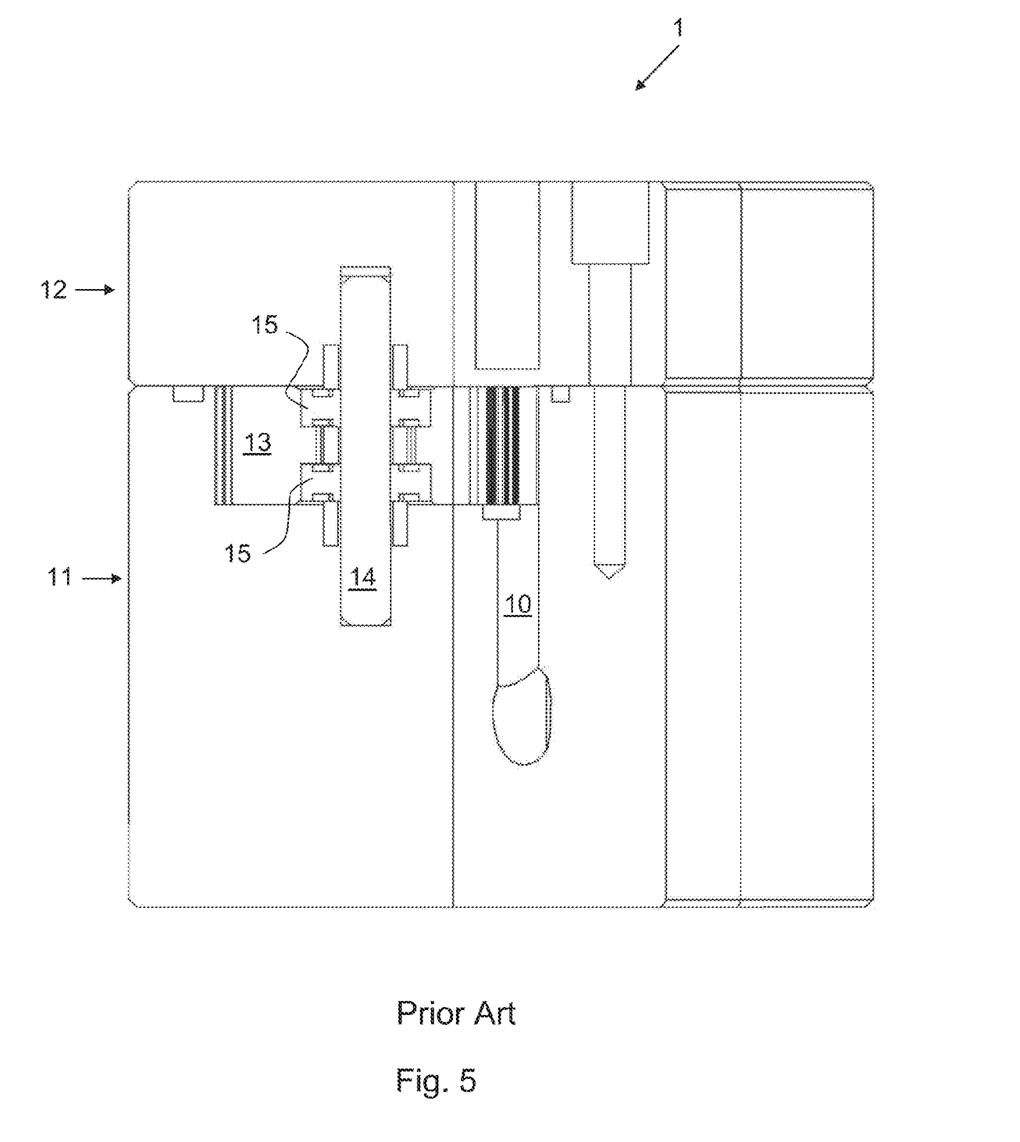
FIG. 5 shows a cross-sectional view of a conventional gear flow meter.

A cross-section of a conventional gear flow meter 1 is shown schematically in FIG. 5. This has at least one measuring gear wheel 13 which is received in a depression of a main body 11. This depression is closed by a cover 12 to form a gear chamber. A fluid, of which the flow is to be measured, passes via a feed line 10 in the main body 11 into the gear chamber. As the fluid flows through the gear chamber, the measuring gear wheel 13 rotates. The rotation of the measuring gear wheel 13 is detected in order to determine the through-flow quantity.

For rotatable mounting of the measuring gear wheel 13, a rod or a rotation axis 14 is arranged through the centre of said measuring gear wheel 13. Said rotation axis 14 extends from the main body 11 through the gear chamber into the cover 12. The measuring gear wheel 13 is mounted on the rotation axis 14 via two deep groove ball bearings 15. A spacer ring is arranged between the two ball bearings 15, said spacer ring also surrounding the rotation axis 14. In addition, in the example shown, a bearing is arranged in a depression of the cover 12 around the rotation axis 14. A further bearing is positioned in a corresponding depression in the main body 11 below the measuring gear wheel 13.

By means of these components, in particular the deep groove ball bearing 15, a low-friction rotation of the measuring gear wheel 13 is to be facilitated.

Figure 6:
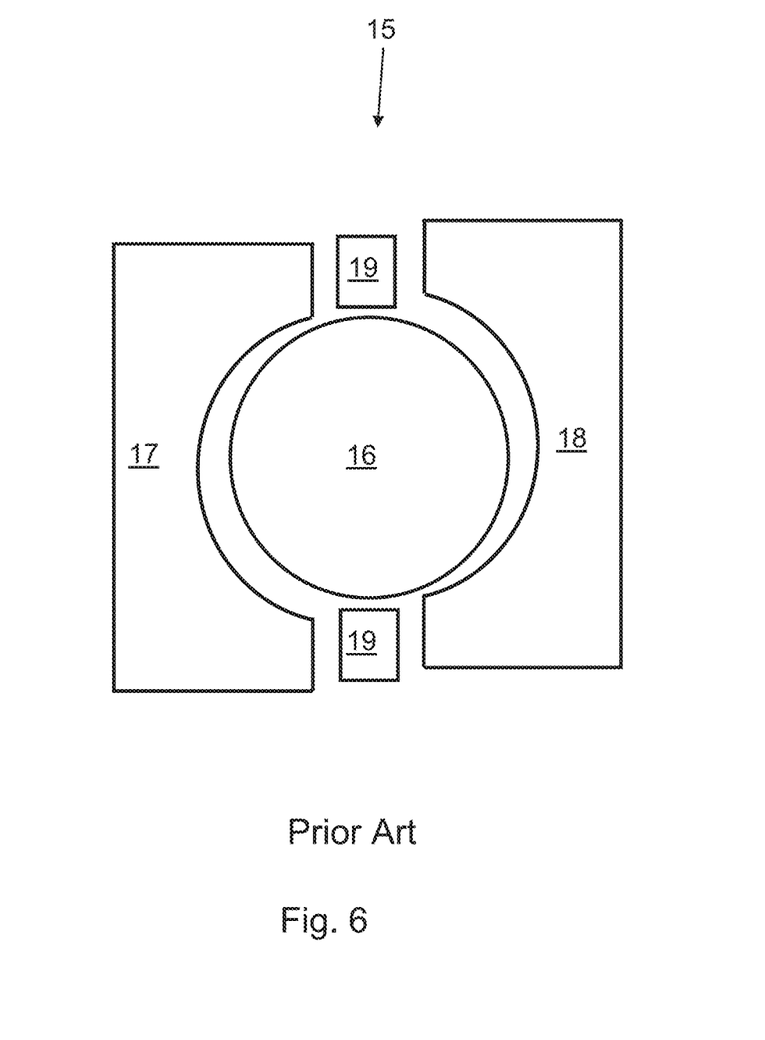
FIG. 6 shows a cross-sectional view of a known deep groove ball bearing.

Such a deep groove ball bearing 15 is schematically shown in a section in FIG. 6. It comprises a plurality of balls or rolling bodies 16 which contact an inner ring 17 and an outer ring 18. The inner ring 17 surrounds the rotation axis 14 shown in FIG. 5 and is fixed relative to the rotation axis 14 during operation. The outer ring 18 contacts the measuring gear wheel 13 with its outer surface and is fixed relative to said measuring gear wheel 13 during operation. In addition the inner ring 17 and the outer ring 18 are connected by two sealing discs 19, and a cage (not shown) holds the rolling bodies 16 within the ball bearing 15.

In this ball bearing 15 a clearance is present between the components, that is to say undesirable movements between the components of the ball bearing 15 are possible. This is shown in FIG. 6 through an offset between the inner ring 17 and the outer ring 18. In order to reduce this clearance, compensating discs can be arranged on the upper and/or lower side shown in FIG. 6. Turbulent running of the measuring gear wheels can indeed hereby be reduced. Nonetheless, a slight tilting of the measuring gear wheels can arise, which results in imprecisions in the through-flow measurement. Leakage flows can also arise along the rolling bodies 16 as a result of the clearance. These leakage flows have a disadvantageous effect upon the precision of the through-flow determination. Furthermore, friction during rotations of the measuring gear wheel does not only lead to measurement imprecisions but also to a high starting torque, with which measurements of lower fluid flows are prevented.

JP S62 51232 discloses a gear flow meter. This uses two measuring gear wheels. In order to mount them, a ring element is present for each in an inner space of the measuring gear wheel, said ring element contacting a plurality of balls. Low-friction mounting is provided through the balls.

Further gear flow meters are known from WO 2007/104517 and EP 0 393 294 A1. Two measuring gear wheels are thereby used in each case which are held via roller bearings.

It can be regarded as an object of the invention to provide a gear flow meter which facilitates through-flow measurement which is as precise as possible at the same time as having a simple structure.

This object is achieved by a gear flow meter having the features of claim 1.

Advantageous variants of the gear flow meter according to the invention are the subject matter of the dependent claims and are additionally described in the following description, in particular in association with the figures.

It is provided according to the invention in the gear flow meter of the abovementioned type that a respective receiving area is provided between each measuring gear wheel and the bottom and between each measuring gear wheel and the cover, rolling elements being arranged in said receiving areas for mounting the respective measuring gear wheel. It is also provided according to the invention that the rolling elements directly contact the respective measuring gear wheel, the respective rotation shaft and the bottom or cover and that the rolling elements are each movable as a whole relative to the rotation shaft, the measuring gear wheel and the bottom or cover which they contact.

In order to reduce leakage flows and frictions, a breakaway torque or tilting movement of the measuring gear wheel which is as small as possible is desired. This can be achieved if a rotation axis of the rolling elements lies as far outwards as possible. The invention is based upon the recognition that a displacement of the rotation axis outwards using larger conventional ball bearings is not meaningful, because the reduced thickness of the measuring gear wheel associated therewith does not offer sufficient strength and stability. Running surfaces of the rolling elements are therefore formed as a central idea of the invention by the measuring gear wheel and the rotation shaft itself. The space required for mounting can advantageously thereby be reduced in the radial direction relative to the rotation shaft. The expanse of this space can be equal to a diameter of the rolling elements. Through this reduced space requirement for mounting, a sufficient thickness and material strength of the measuring gear wheel can also be achieved when the rotation axis of the rolling elements lies further outwards to reduce the breakaway torque.

It can additionally be regarded as a core idea of the invention to reduce the components necessary for the mounting of the at least one measuring gear wheel. A conventional deep groove ball bearing is thus replaced by individual rolling elements or roller bodies. The inner ring of a ball bearing which separates the roller bodies from the rotation shaft is thereby omitted. Instead, according to the invention the rolling elements contact the rotation shaft directly. In the same way, the outer ring of a ball bearing between the rolling elements and the measuring gear wheel is omitted. Instead, according to the invention the rolling elements contact the measuring gear wheel directly without additional components being arranged between them.

In addition the measuring gear wheels are mounted on their end faces via the rolling elements. According to the invention, for this, the rolling elements located in the receiving area between cover and measuring gear wheel contact both the cover and also the measuring gear wheel directly. Correspondingly, rolling elements in the receiving area between the bottom and measuring gear wheel contact both the bottom and also the measuring gear wheel directly. The rolling elements thus advantageously serve in a receiving area both for mounting in the direction of a rotation axis, that is to say in the longitudinal direction of the rotation shaft, and also in a radial direction thereto.

The clearance on the components provided for mounting is determined by the manufacturing tolerances of all components. As the number of these components is reduced according to the invention in comparison with conventional ball bearings, the total clearance is advantageously reduced on the assembly without stricter manufacturing tolerances being required e.g. for the rolling elements.

A rolling element can be understood to be a single roundish body. Accordingly the rolling elements are each movable as a whole relative to the adjacent rotation shaft, the adjacent measuring gear wheel, the cover and the bottom. A rolling element is not therefore to be understood to be a whole ball bearing which also comprises components which are not movable relative to the rotation shaft or to the measuring gear wheel.

It can be regarded as a particular advantage of the invention that, as a result of the reduced number of components between a measuring gear wheel and its rotation axis, the clearance of these components is reduced. On the one hand leakage flows can hereby be reduced along the rotation axis. On the other hand a tilt movement of the measuring gear wheels is hereby reduced. This results in an increase in the precision of the amount of fluid conveyed with the rotation of a gear wheel.

A further essential advantage of the gear flow meter according to the invention is a better rinsing ability. This is achieved through the reduced number of components for mounting the measuring gear wheels in comparison with conventional gear flow meters with deep groove ball bearings. Thorough cleaning can be particularly significant if the fluid is for example a paint.

Clear improvements are also achieved having regard to the measurement of very small amounts of fluid. Conventional gear flow meters require high start-up forces, on account of the comparatively high friction, and can only provide precise results with effect from a volume flow of approximately 5 $cm^3$ per minute. On the other hand, as a result of the reduced friction with the gear flow meter according to the invention, already volume flows of 2 $cm^3$ per minute or less can be determined.

The measuring unit used in the invention can in principle be of any type and be designed for example through a capacitive, inductive or optical sensor or also an ultrasound sensor. It can hereby be detected for example whether a tooth of one of the measuring gear wheels is present at a measurement position. The number of teeth passing by per time unit can be determined with this information. The amount of fluid which can be transported for each intermediate space of two adjacent teeth is known or can be determined in a calibration measurement. The amount of fluid flowing through per time unit can thus be determined from the number of teeth detected at the measurement position per time unit, that is to say from the rotation of the gear wheel.

The evaluation means for determining a through-flow can be arranged either in a shared housing with the gear chamber or also in an external unit, for example software-implemented on a computer.

In a preferred variant of the gear flow meter according to the invention, each rotation shaft is formed by a fixed rotation axis, in relation to which the respective measuring gear wheel is rotatably mounted via the rolling elements. The rotation shaft can be fixedly connected to the cover and/or bottom. The measuring gear wheel can have a central opening from one end face to the other. The rotation shaft runs through this opening. The surfaces of the central opening can be described as the gear wheel inner side. In this embodiment, the measuring gear wheel is mounted in a direction perpendicular to its rotation axis by the rolling elements contacting both the rotation shaft and also, in opposition thereto, the measuring gear wheel.

Alternatively, according to a further preferred variant, each rotation shaft is formed by a circulating axis which is fixedly connected to the respective measuring gear wheel. The measuring gear wheel is hereby only rotatable jointly with the rotation shaft. Consequently, a friction contact between the rotation shaft and the bottom or cover is also to be avoided here. For this, initially the bottom and the cover have a recess, into which the rotation shaft respectively extends. The mounting of the rotation shaft and the measuring gear wheel is then realised in a direction transverse to the rotation axis thereof by rolling elements contacting both the rotation shaft and also, opposite thereto, the bottom or the cover.

In a preferred embodiment of the gear flow meter according to the invention, the receiving areas are respectively formed by a stepped gap which is a depression in an end face of the measuring gear wheel or in the bottom and in the cover. Each stepped gap is thereby open towards the rotation shaft.

If the rotation shaft is formed as a circulating axis, the bottom and the cover preferably have a recess, into which the rotation shaft extends. In this embodiment it is preferable for each measuring gear wheel for a stepped gap to be formed in the bottom and a step gap to be formed in the cover. Each stepped gap is thereby open towards the recess, into which the rotation shaft extends.

In the case of a fixed rotation axis as a rotation shaft, the receiving area is preferably formed as a depression in the measuring gear wheel. A rolling element in the stepped gap on the measuring gear wheel thus extends as far as the end face or beyond the end face and as far as the gear wheel inner side or beyond the gear wheel inner side.

In order that a rolling element contacts both the stepped gap and also the rotation shaft, a stretch from an outer circumference of the rotation shaft to an outer end of the stepped gap can be equal to or smaller than the diameter of the rolling elements. In order to avoid contact between a measuring gear wheel and an associated fixed rotation shaft or in order to avoid contact between a circulating rotation shaft and the bottom or cover, a radial width of the stepped gap can be selected to be smaller than the diameter of the rolling elements. For example the radial width can be smaller by up to 5% to 20%, preferably 10% to 15%, so that the rolling elements project out of the stepped gap towards the rotation shaft. The rolling elements hereby contact the rotation shaft while undesirable contact between the measuring gear wheel and the rotation shaft is avoided.

In principle, a cross-sectional form of the stepped gap can be as desired. It is preferred, however, for each stepped gap to respectively have a bottom wall extending transverse to a rotation axis of the measuring gear wheel and a side wall extending in the direction of the rotation axis, and for the rolling elements to directly contact the side wall and the bottom wall of the stepped gap, in which they are arranged.

The side wall can hereby extend either parallel to the rotation axis or at an inclination angle which is smaller than an inclination angle of the bottom wall relative to the rotation axis. Insofar as the rolling elements contact the stepped gap at two positions, namely on the side wall and on the bottom wall, a secure positioning of the rolling elements can be achieved with limited undesirable clearance.

It is particularly easy to clean or rinse a stepped gap if each stepped gap has a rounded-off or inclined transition region between its bottom wall and its side wall. In addition, hollow spaces are hereby reduced around the rolling element which can lead to leakage flows or offer space for undesirable deposits.

These hollow spaces between the receiving ring and rolling elements received therein can be reduced particularly far if a radius of curvature of the rounded-off transition region deviates from a radius of the rolling elements by at most 20%, preferably at most 10%. The radius of curvature can thereby be greater than or smaller than the radius of the rolling elements.

In principle, however, a transition region can also be formed by one or more straight surfaces which are inclined relative to the bottom wall and the side wall.

It is preferable for at least two measuring gear wheels to be arranged engaging in each other in the gear chamber. Each of the measuring gear wheels can let the fluid through between its teeth on a region towards a wall of the gear chamber. Insofar as the measuring gear wheels engage in each other, a fluid flow between the measuring gear wheels is prevented. A measurement on one of the measuring gear wheels is sufficient to determine the gear rotation. The measuring gear wheels have rotation axes differing from each other and are respectively mounted in the manner according to the invention via rolling elements.

An end face, in which a receiving area can be formed, is to be understood to be a side of a measuring gear wheel which is transverse or perpendicular to the rotation axis. Accordingly, each measuring gear wheel can have two receiving areas, on which rolling elements contact the rotation shaft. Through these two contact areas, a stable orientation of the measuring gear wheel relative to its rotation shaft, that is to say in the radial direction relative to the rotation axis, is achieved. If the rolling elements project from both end faces, undesirable friction between the end faces of the measuring gear wheel and the bottom and the cover can additionally be avoided.

For the formation of the gear chamber it is provided according to a preferred embodiment that the bottom and/or the cover has/have a recess, in which the at least one measuring gear wheel is arranged. The gear chamber is hereby delimited on the end faces of the measuring gear wheel and laterally relative to the measuring gear wheel by the bottom and the cover.

Instead of this two-part structure delimiting the gear chamber, a three-part structure can also be provided. The gear chamber is hereby likewise delimited on the end faces of the at least one measuring gear wheel by the bottom and the cover. However, a middle element is provided to laterally delimit the gear chamber, said middle element laterally surrounding the at least one measuring gear wheel. The middle element, the bottom and the cover are formed in at least three parts and are connected to each other. The lateral delimitation of the gear chamber is to be understood as a limitation of a plane transverse, in particular perpendicular, to the rotation axis of the measuring gear wheel. In contrast with a two-part structure, it is not necessary in the case of the present three-part structure for the bottom to have a depression to receive measuring gear wheels. Precise machining of a side of the bottom and cover pointing towards the gear chamber is hereby advantageously simplified.

The advantage of simplified machining is particularly significant in embodiments in which the bottom and the cover have a planar surface towards the gear chamber to hold the rolling elements, wherein the rolling elements directly contact the planar surface. A receiving area for a rolling element is thus delimited in a first direction by the bottom or cover, in a further direction by the rotation shaft and, opposite to the rotation shaft and opposite to the bottom or cover, by the measuring gear wheel.

In order that friction between the rolling elements and the respectively adjacent area of the bottom or cover is as low as possible, regions of the bottom or cover which contact the rolling elements are preferably smoothened. The machining steps for smoothening can be carried out relatively easily and precisely if the bottom and the cover do not have a depression to receive a measuring gear wheel, as is required in a two-part formation of the gear chamber, but instead have no sections at least in the region of the gear chamber and projecting beyond a side delimitation of the gear chamber. A two-part structure can, however, also be preferred, for example on the basis of the reduced number of components to be exactly manufactured.

In order to reduce abrasion or wear of the components used for mounting, surfaces of the rolling elements are preferably hardened. The measuring gear wheels and/or the bottom and/or cover and/or the rotation shafts can be hardened at least in regions facing towards the rolling elements or have a coating, of which the hardness is higher than that of a material adjacent to the coating. For example walls of the receiving areas of the measuring gear wheels can be hardened while other areas of the measuring gear wheels do not absolutely have to be hardened. Similarly, it can be provided that the receiving areas of the measuring gear wheels are provided with a coating, of which the hardness is greater than that of the measuring gear wheel.

The conveying of a fluid to the gear chamber and out of the gear chamber can be realised in principle in any way through channels in the bottom, cover and middle element. Particularly precise measurements and a comparatively low-priced manufacture are, however, possible, if the middle element does not have a channel to convey the fluid to the gear chamber or out thereof and, for this purpose, the bottom or the cover has a fluid inlet to convey a fluid into the gear chamber and the bottom or the cover has a fluid outlet to convey the fluid out of the gear chamber. The bottom and cover can thereby have different expanses in the direction of the rotation axis. In particular, the bottom can have a greater expanse than the cover.

In addition, through a three-part structure, the bottom and the cover can also be used for measuring gear wheels of different thicknesses, thus different expanses in the direction of the rotation axis. Solely the middle element must be selected correspondingly to the thickness of the measuring gear wheel to be used in the respective case.

In a preferred variant of the gear flow meter according to the invention, rolling elements are arranged contacting each other in the receiving areas. In order to facilitate insertion of the rolling elements into the receiving area, a circumferential length of the receiving area can thereby be greater than the overall expanse of the rolling elements used, so that not all rolling elements contact each other. Such an arrangement can be achieved in particular if the rolling elements are arranged free of ball bearing cages in the receiving areas. Friction between the rolling elements and a cage is hereby advantageously precluded. In addition, a greater number of rolling elements can be used in comparison with the case of a spaced-apart holding of the rolling elements, whereby this also has a friction-reducing effect and facilitates a better force progression.

The rolling elements can in principle be any round bodies. Preferably, however, they are balls. Due to the symmetry of balls, advantageously no means are required to direct the balls in the receiving area. Alternatively, the rolling elements can, however, also have the form of a cylinder, of which the end faces are outwardly curved.

Experiments have shown that tilting of the measuring gear wheel is particularly low if the balls are relatively small in comparison with balls of ball bearings in conventional gear flow meters. In an embodiment of the invention the balls have a diameter of less than 2 mm, preferably less than 1.3 mm.

Further features and advantages of the invention are described by reference to the attached schematic drawing, in which.

The same components and those working in the same way are generally identified by the same reference symbols in the figures.

Figure 1:
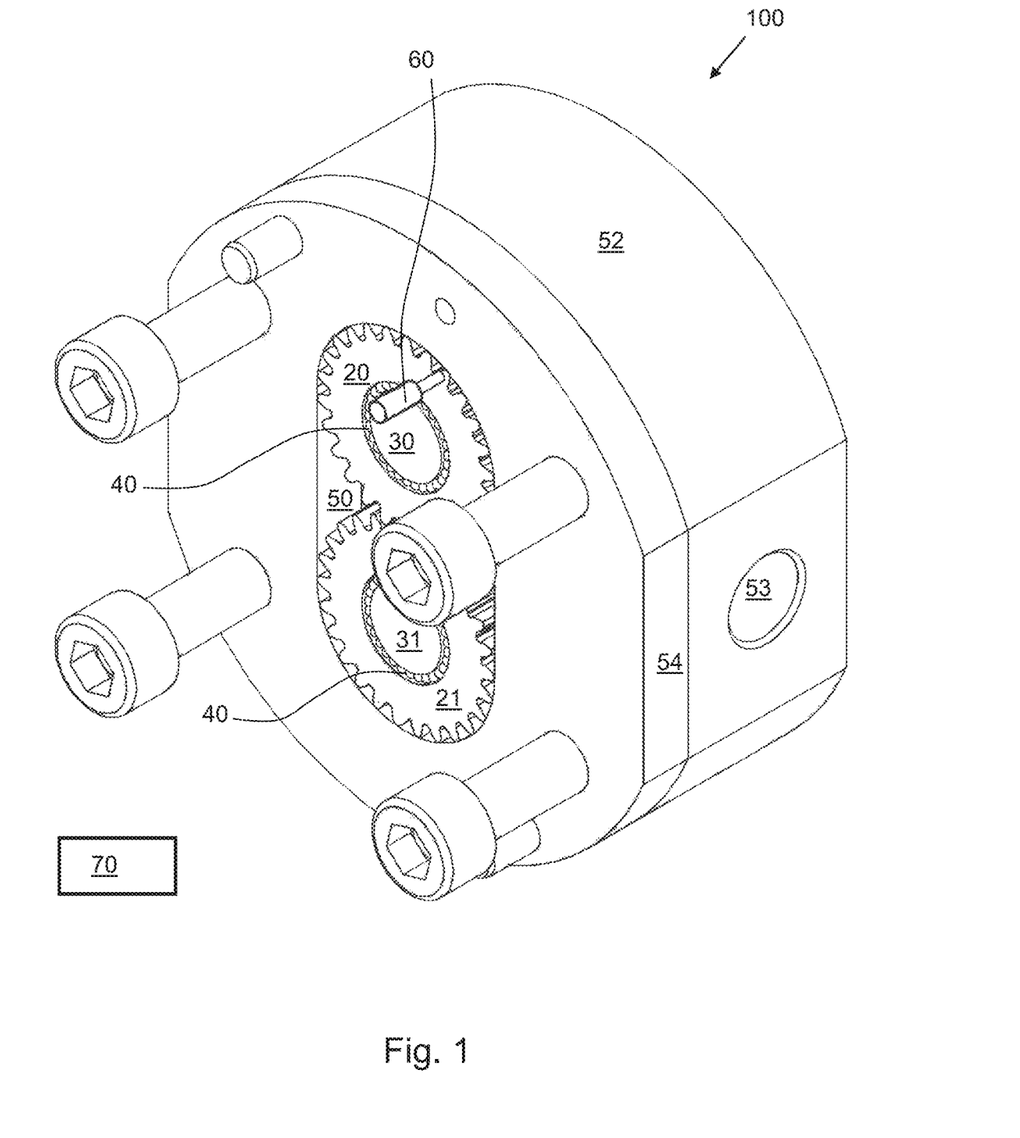
FIG. 1 shows a perspective view of an exemplary embodiment of a gear flow meter according to the invention.
Figure 2:
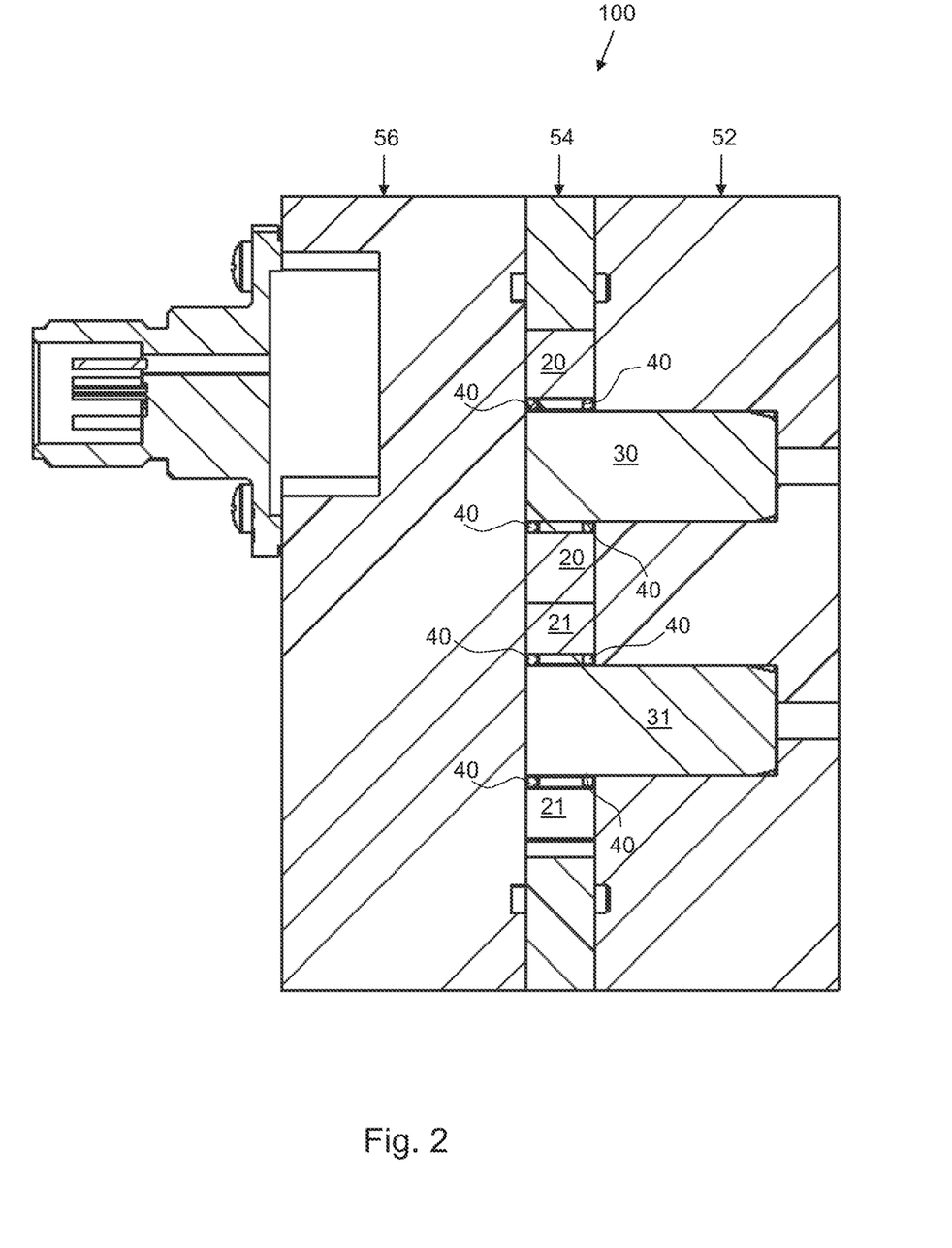
FIG. 2 shows a cross-sectional view of the gear flow meter of FIG. 1.

An exemplary embodiment of a gear flow meter 100 according to the invention is initially described by reference to FIGS. 1 and 2. FIG. 1 thereby shows a perspective view of the gear flow meter 100 and FIG. 2 shows a section hereof, which extends through both rotation axes of the gear flow meter 100.

By way of essential components, the gear flow meter 100 has a gear chamber 50, two measuring gear wheels 20 and 21 arranged therein, a respective rotation shaft 30 and 31 for the two measuring gear wheels 20 and 21 and rolling elements 40 for mounting the measuring gear wheels 20 and 21.

In principle, a single measuring gear wheel 20 can also suffice or a greater number than two measuring gear wheels can be present.

A fluid can traverse the gear chamber 50 preferably exclusively on the wall thereof between adjacent teeth of one of the measuring gear wheels 20, 21. Through this flow, the fluid sets the measuring gear wheels 20, 21 in motion. Insofar as the rotation of one or both measuring gear wheels 20, 21 is detected, the fluid flow can be concluded. For this purpose, a measuring unit 60 is provided. This determines the number of teeth of a measuring gear wheel which pass by a measurement position per time unit. Evaluation means 70, which are shown purely schematically in FIG. 1, use the measurement information of the measuring unit 60 to determine the flow of the fluid through the gear chamber 50.

In order to precisely determine the fluid flow it is desirable for the same amount of fluid to constantly be transported between two adjacent teeth of a measuring gear wheel 20, 21. In addition, frictions arising upon rotation of the measuring gear wheels 20, 21 are to be as limited as possible and to be constant in terms of time. It is thus desirable for the measuring gear wheels 20, 21 to be mounted with limited clearance and to be able to realise as little tilt movement as possible.

According to the invention this is achieved by a new type of mounting of the measuring gear wheels 20, 21 on their respective rotation shafts 30, 31. This mounting is described in greater detail for a first exemplary embodiment having regard to FIG. 3. This shows a cut-out of a measuring gear wheel 20 and the components adjacent thereto. The measuring gear wheel 20 thereby has a central opening, through which the rotation shaft 30 extends, which is designed here as a fixed rotation axis 31. In order to facilitate a low-friction rotation of the measuring gear wheel 20 around the rotation shaft 30, rolling elements 40 are provided which directly contact both the measuring gear wheel 20 and also the rotation shaft 30. The mounting of the measuring gear wheel 20 differs herein from the mounting in conventional gear flow meters which use a deep groove ball bearing, as shown in FIG. 6. In such a case, rolling elements do not contact the measuring gear wheel, but instead an interposed outer ring of the ball bearing. In addition, in conventional gear flow meters the rolling elements do not directly contact a rotation shaft of a measuring gear wheel but instead an inner ring of a ball bearing.

Figure 3:
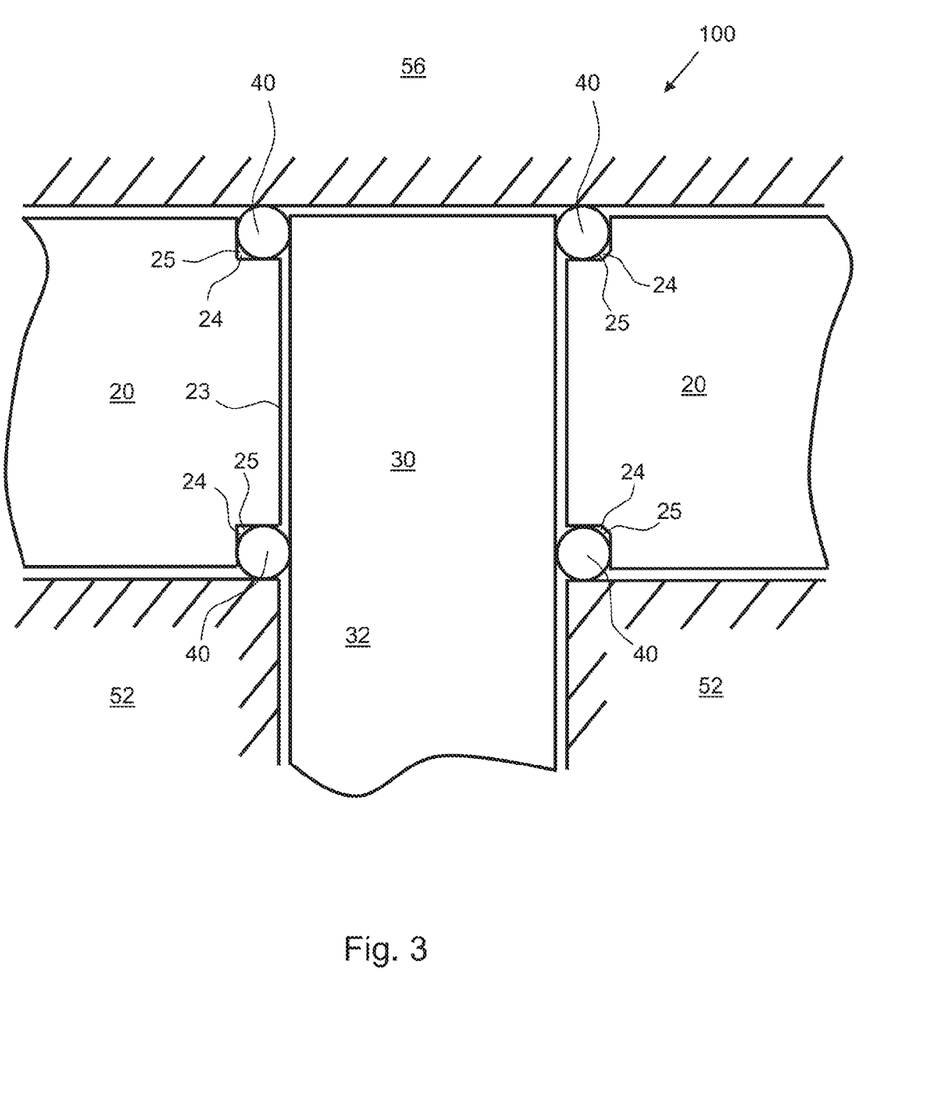
FIG. 3 shows a cut-out of an exemplary embodiment of a gear flow meter according to the invention.

Insofar as according to the invention the running surfaces of the rolling elements 40, which are formed here as balls 40, are directly formed by the measuring gear wheel 20 and the rotation shaft 30, the inner ring, the outer ring and the cage of a ball bearing are omitted.

A diameter of a ball rotation axis can hereby be selected to be greater than in conventional assemblies. A tilt point of the measuring gear wheel 20 thus lies further outwards than in conventional gear flow meters, whereby the breakaway torque of the measuring gear wheel 20 is advantageously lower.

In addition, according to the invention the friction of the balls against the cage is not present, whereby the measuring gear wheel rotates more easily. Without the numerous components of a ball bearing, it is additionally possible in a simple way to rinse all surfaces on the balls 40, the measuring gear wheel 20 and the rotation axis 30 for cleaning purposes.

In the gear flow meter according to the invention shown in FIG. 3, a separate spacer is also omitted, whereby this is arranged in conventional gear flow meters on a gear inner side between the rolling elements of the upper end face and rolling elements of the lower end face of the measuring gear wheel. Instead, according to the invention this function can be fulfilled by the body of the measuring gear wheel 20 itself.

In order to secure a desired position of the balls 40, the measuring gear wheel 20 is provided with two receiving areas 24, in which the balls 40 are arranged. The two receiving areas 24 can be milled and are formed as annular depressions in the two end faces of the measuring gear wheel 20. The receiving areas 24 are thereby located on the gear wheel inner side 23 so that the receiving areas 24 are open towards the rotation axis 30 and form a stepped depression 25.

It can be provided for easier cleaning on the measuring gear wheel 20 that a side wall of the receiving area 24 which extends in the direction of the rotation axis of the measuring gear wheel 20, and a bottom wall of the receiving area 24 which is transverse, in particular perpendicular, to the rotation axis, are not at a right angle to each other. Instead, an inclined or rounded-off transition region can be provided between the side wall and the bottom wall of a receiving area 24, as shown in the right half of FIG. 3. Dead spaces which cannot be rinsed or are difficult to rinse can hereby be avoided.

The width of a receiving area 24, that is to say its dimensions in a direction radially relative to the rotation axis, is smaller in the present case than a diameter of the balls 40. The balls 40 hereby project inwards beyond the gear wheel inner side 23, so that the latter is not in contact with the rotation shaft 30. Similarly, the depth of the receiving areas 24, as seen from the respective end face of the measuring gear wheel 20, is smaller than the diameter of the balls 40. The balls 40 hereby also project beyond the end face. A bottom 52 and a cover 56 which are adjacent to the end faces of the measuring gear wheel 20 thus contact solely the balls 40 and not the measuring gear wheel 20. The friction during rotation of the measuring gear wheel 20 is thus reduced.

In the area of the measuring gear wheel 20, the bottom 52 and cover 56 are planar and smoothened to reduce friction.

The bottom 52 has an opening, through which the rotation shaft 30 extends through the gear chamber as far as the cover 56. The rotation shaft 30 can thereby be inserted or pressed in a sealing manner into the opening of the bottom 52. Alternatively, the rotation shaft 30 can also be integrally formed with the bottom. In the embodiment shown, the rotation shaft 30 is adjacent to the cover 56. Alternatively, however, the cover 56 can also have a receiving opening for the rotation shaft 30.

A middle element 54 is present between the bottom 52 and the cover 56, said middle element 54 surrounding the measuring gear wheels 20, 21 and thus laterally delimiting the gear chamber 50. Such a middle element is shown in FIGS. 1 and 2.

It is additionally shown in these figures that the cover 52 has a fluid inlet 53. Fluid can be conveyed via this fluid inlet 53 into the gear chamber 50. A fluid outlet (not shown here) conveys the fluid out of the gear chamber 50 and is formed in the cover 52 or cover 56.

Figure 4:
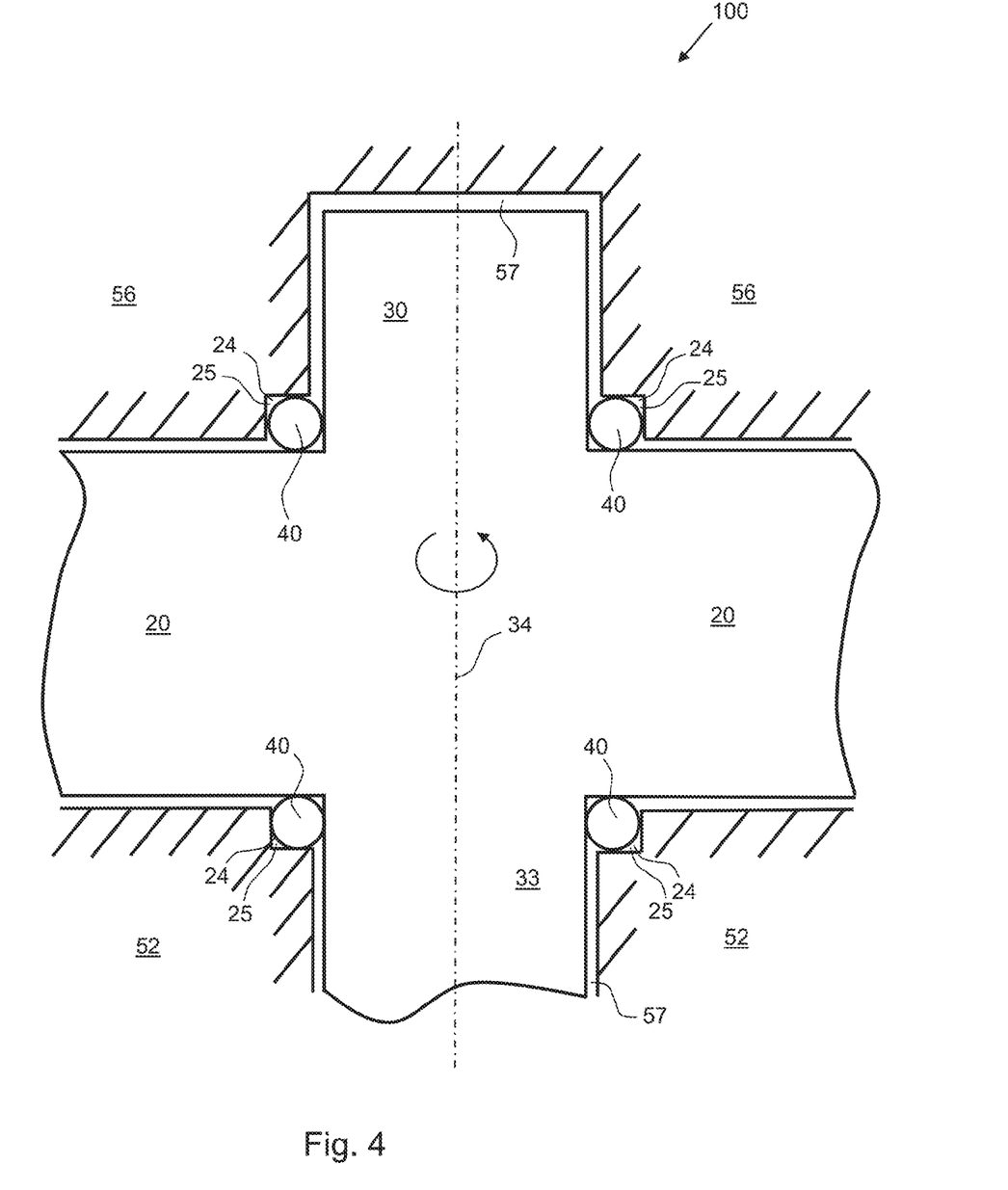
FIG. 4 shows a cut-out of a further exemplary embodiment of a gear flow meter according to the invention.

A further exemplary embodiment of a gear flow meter 100 according to the invention is shown schematically in FIG. 4. Unlike the exemplary embodiment of FIG. 3, the rotation shaft 30 is designed here as a circulating rotation axis 33. This is fixedly connected to the measuring gear wheel 20. Both the measuring gear wheel 20 and also the rotation shaft 30 thus rotate around the rotation axis 34.

In this embodiment, two receiving areas 24 with rolling elements 40 are likewise provided for each measuring gear wheel 20. The receiving areas 24 are not formed here, however, as depressions in the measuring gear wheel 20 but instead as depressions in the bottom 52 and in the cover 56. The rolling elements 40 contact the respective receiving area 24 and thus the bottom 52 or cover 56 on two sides, namely on the bottom wall and the side wall of the receiving area 24. In addition the rolling elements 40 contact an end face of the measuring gear wheel 20 in a direction parallel to the rotation axis 34, whereby mounting is realised in the direction of the rotation axis 34. In the plane perpendicular thereto, mounting is realised in that the rolling elements 40 contact a shell surface of the rotation shaft 30 which extends parallel to the rotation axis 34.

The bottom 52 and the cover 56 each have a recess 57, into which the rotation shaft 30 projects. The recesses 57 can be formed as depressions or passages. The receiving areas 24 for the rolling elements 40 extend annularly around the recesses 57 and are directly adjacent to them. They thereby form stepped depressions 25 which are open towards the respective end face of the measuring gear wheel 20 and towards the recess 57.

Finally, the gear chamber is surrounded here in two parts. The bottom 52 thereby has a recess (not shown in greater detail in FIG. 4), into which the measuring gear wheel 20 is inserted. Through this recess, a lateral delimitation of the gear chamber is defined.

As a result of the new type of mounting, the friction on the measuring gear wheels of the gear flow meter according to the invention is particularly low. In addition, tilting of the measuring gear wheels and the occurrence of leakage flows are extensively avoided. Finally, particularly small volume flows can be measured as a result of the low friction.

The invention claimed is:

1. A gear flow meter for measuring the flow of a fluid, having
   a gear chamber, in which at least one measuring gear wheel is arranged,
   a bottom and a cover which delimit the gear chamber on end faces of the at least one measuring gear wheel,
   wherein a respective rotation shaft is provided centrally relative to each measuring gear wheel,
   wherein each measuring gear wheel is rotatably mounted and a fluid is conveyable through the gear chamber to rotate the at least one measuring gear wheel,
   and having a measuring unit to detect a gear rotation and evaluation means to determine a flow of the fluid through the gear chamber on the basis of the gear rotation,
   wherein
   a respective receiving area is provided between each measuring gear wheel and the bottom and also between each measuring gear wheel and the cover, in which receiving area rolling elements are arranged for mounting the respective measuring gear wheel,
   the rolling elements directly contact the respective measuring gear wheel, the respective rotation shaft and the bottom or cover, wherein running surfaces of the rolling elements are formed by the measuring gear wheel and the rotation shaft itself, and
   the rolling elements are each movable as a whole relative to the rotation shaft, the measuring gear wheel and the bottom or cover which they contact.

2. The gear flow meter according to claim 1,
   wherein
   at least two measuring gear wheels are arranged engaging in each other in the gear chamber.

3. The gear flow meter according to claim 1,
wherein
the receiving areas are respectively formed by a stepped gap which is a depression in an end face of the measuring gear wheel or in the bottom and in the cover, and
each stepped gap is open towards the rotation shaft.

4. The gear flow meter according to claim 3, wherein each stepped gap respectively comprises a bottom wall which extends transversely relative to a rotation axis of the measuring gear wheel, and a side wall which extends in the direction of the rotation axis, and the rolling elements directly contact the side wall and the bottom wall of the stepped gap, in which they are arranged.

5. The gear flow meter according to claim 3,
wherein
each stepped gap has a rounded-off or inclined transition region between its bottom wall and its side wall.

6. The gear flow meter according to claim 1,
wherein
each rotation shaft is formed by a fixed rotation axis, relative to which the respective measuring gear wheel is mounted so that it can be rotated via the rolling elements.

7. The gear flow meter according to claim 1,
wherein each rotation shaft is formed by a circulating axis which is fixedly connected to the respective measuring gear wheel.

8. The gear flow meter according to claim 1,
wherein the gear chamber is laterally delimited by a middle element which laterally surrounds the at least one measuring gear wheel,
the bottom and the cover are respectively connected to the middle element, and the bottom, the cover and the middle element are formed in at least three parts.

9. The gear flow meter according to claim 1,
wherein
the bottom and/or the cover has/have a recess, in which the at least one measuring gear wheel is arranged,
the gear chamber is delimited on the end faces of the measuring gear wheel and laterally to the measuring gear wheel by the bottom and the cover.

10. The gear flow meter according to claim 1,
wherein
the bottom and the cover have a planar surface to hold the rolling elements, wherein the planar surface is smoothened and the rolling elements directly contact the planar surface.

11. The gear flow meter according to claim 1,
wherein
at least regions of the measuring gear wheels and/or of the bottom and of the cover and/or of the rotation shafts are hardened or have a coating, of which the hardness is greater than that of a material adjacent to the coating.

12. The gear flow meter according to claim 1,
wherein
rolling elements are arranged in the receiving areas in contact with each other.

13. The gear flow meter according to claim 1,
wherein
the rolling elements are arranged in the receiving areas free of ball bearing cages.

14. The gear flow meter according to claim 1,
wherein
the rolling elements are balls.

* * * * *